United States Patent
Yen et al.

(10) Patent No.: US 11,003,970 B1
(45) Date of Patent: May 11, 2021

(54) ADVANCED LOYALTY APPLICATIONS FOR POWERED CARDS AND DEVICES

(71) Applicant: Dynamics Inc., Cheswick, PA (US)

(72) Inventors: Philip W. Yen, The Sail (SG); Jeffrey D. Mullen, Glenshaw, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

(21) Appl. No.: 16/153,594

(22) Filed: Oct. 5, 2018

Related U.S. Application Data

(63) Continuation of application No. 15/925,624, filed on Mar. 19, 2018, now abandoned, which is a continuation of application No. 15/815,648, filed on Nov. 16, 2017, now Pat. No. 9,953,255, which is a continuation of application No. 13/944,455, filed on Jul. 17, 2013, now Pat. No. 9,852,368, which is a
(Continued)

(51) Int. Cl.
  *G06K 5/00* (2006.01)
  *G06K 7/08* (2006.01)
  *G06K 19/06* (2006.01)
  *G06K 19/077* (2006.01)

(52) U.S. Cl.
  CPC . *G06K 19/06206* (2013.01); *G06K 19/07701* (2013.01)

(58) Field of Classification Search
  USPC ............. 235/380, 383, 449, 451, 492, 493
  See application file for complete search history.

(56) References Cited

U.S. PATENT DOCUMENTS

| 4,353,064 A | 10/1982 | Stamm |
| 4,394,654 A | 7/1983 | Hofmann-Cerfontaine |
| 4,614,861 A | 9/1986 | Pavlov et al. |

(Continued)

FOREIGN PATENT DOCUMENTS

| JP | 05210770 A | 8/1993 |
| WO | WO9852735 | 11/1998 |

(Continued)

OTHER PUBLICATIONS

The Bank Credit Card Business. Second Edition, American Bankers Association, Washington, D.C., 1996.
(Continued)

*Primary Examiner* — Tuyen K Vo
(74) *Attorney, Agent, or Firm* — Andrew Veter

(57) ABSTRACT

Advanced loyalty applications are provided to improve the functionality of cards and devices. For example, a user interface may be placed on a card (e.g., a physical button) or a telephonic device (e.g., a virtual button on a capacitive touch screen). Manual input provided to this user interface may, for example, cause a non-merchant product (e.g., insurance) to be purchased with a merchant purchase. The product can be paid for with debit, credit, gift card balance, or points. A code indicative of a user's desire to purchase the product may be communicated to a payment card reader (e.g., to a magnetic stripe reader via a magnetic stripe communications device). A display may be provided next to a button to allow a user to scroll, or toggle by pressing the button repeatedly, through different products (which may be merchant or non-merchant products).

11 Claims, 5 Drawing Sheets

Related U.S. Application Data continuation of application No. 12/857,766, filed on Aug. 17, 2010, now Pat. No. 8,511,574.

(60) Provisional application No. 61/234,583, filed on Aug. 17, 2009.

(56) References Cited

U.S. PATENT DOCUMENTS

| | | |
|---|---|---|
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,844,230 A | 12/1998 | Lalonde |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,895,386 B1 * | 5/2005 | Bachman ............ G06Q 20/105 705/1.1 |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,090,138 B2 | 8/2006 | Rettenmyer et al. |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,594,611 B1 | 9/2009 | Arrington, III |
| 7,602,904 B2 | 10/2009 | Juels et al. |
| 7,611,054 B2 | 11/2009 | Bortolin et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,784,692 B1 | 8/2010 | Arrington, III |

(56) References Cited

U.S. PATENT DOCUMENTS

| | | | |
|---|---|---|---|
| 7,793,851 B2 | 9/2010 | Mullen | |
| 7,828,207 B2 | 11/2010 | Cooper | |
| 7,828,220 B2 | 11/2010 | Mullen | |
| 7,931,195 B2 | 4/2011 | Mullen | |
| 7,954,705 B2 | 6/2011 | Mullen | |
| 8,011,577 B2 | 9/2011 | Mullen et al. | |
| 8,020,775 B2 | 9/2011 | Mullen et al. | |
| 8,066,191 B1 | 11/2011 | Cloutier et al. | |
| 8,074,877 B2 | 12/2011 | Mullen et al. | |
| 8,121,917 B2* | 2/2012 | Insolia | G06Q 30/02 705/35 |
| 8,172,148 B1 | 5/2012 | Cloutier et al. | |
| 8,282,007 B1 | 10/2012 | Cloutier et al. | |
| 8,286,876 B2 | 10/2012 | Mullen et al. | |
| 8,302,872 B2 | 11/2012 | Mullen | |
| 8,382,000 B2 | 2/2013 | Mullen et al. | |
| 8,393,545 B1 | 3/2013 | Mullen et al. | |
| 8,413,892 B2 | 4/2013 | Mullen et al. | |
| 8,424,773 B2 | 4/2013 | Mullen et al. | |
| 8,439,274 B2 | 5/2013 | Chenot | |
| 8,459,548 B2 | 6/2013 | Mullen et al. | |
| 8,459,562 B1 | 6/2013 | Field et al. | |
| 8,485,437 B2 | 7/2013 | Mullen et al. | |
| 8,511,548 B1 | 8/2013 | Mori et al. | |
| 8,511,574 B1 | 8/2013 | Yen et al. | |
| 8,517,276 B2 | 8/2013 | Mullen et al. | |
| 8,523,059 B1 | 9/2013 | Mullen et al. | |
| 8,579,203 B1 | 11/2013 | Lambeth et al. | |
| 8,590,796 B1 | 11/2013 | Cloutier et al. | |
| 8,608,083 B2 | 12/2013 | Mullen et al. | |
| 8,622,309 B1 | 1/2014 | Mullen et al. | |
| 8,668,143 B2 | 3/2014 | Mullen et al. | |
| 8,684,265 B1* | 4/2014 | McGhie | G07F 17/3244 235/375 |
| 8,727,219 B1 | 5/2014 | Mullen | |
| 8,733,638 B2 | 5/2014 | Mullen et al. | |
| 8,757,483 B1 | 6/2014 | Mullen et al. | |
| 8,757,499 B2 | 6/2014 | Cloutier et al. | |
| 8,814,050 B1 | 8/2014 | Mullen et al. | |
| 8,875,999 B2 | 11/2014 | Mullen et al. | |
| 8,881,989 B2 | 11/2014 | Mullen et al. | |
| 8,931,703 B1 | 1/2015 | Mullen et al. | |
| 8,973,824 B2 | 3/2015 | Mullen et al. | |
| 9,004,368 B2 | 4/2015 | Mullen et al. | |
| 9,010,630 B2 | 4/2015 | Mullen et al. | |
| 9,064,255 B1 | 6/2015 | Mullen et al. | |
| 9,292,843 B1 | 3/2016 | Mullen et al. | |
| 9,329,619 B1 | 5/2016 | Cloutier | |
| 9,361,569 B2 | 6/2016 | Mullen et al. | |
| 9,384,438 B2 | 7/2016 | Mullen et al. | |
| 9,547,816 B2 | 1/2017 | Mullen et al. | |
| 9,639,796 B2 | 5/2017 | Mullen et al. | |
| 9,684,861 B2 | 6/2017 | Mullen et al. | |
| 9,697,454 B2 | 7/2017 | Mullen et al. | |
| 9,704,088 B2 | 7/2017 | Mullen et al. | |
| 9,704,089 B2 | 7/2017 | Mullen et al. | |
| 9,727,813 B2 | 8/2017 | Mullen et al. | |
| 9,805,297 B2 | 10/2017 | Mullen et al. | |
| 9,852,368 B1 | 12/2017 | Yen et al. | |
| 9,928,456 B1 | 3/2018 | Cloutier et al. | |
| 9,953,255 B1 | 4/2018 | Yen et al. | |
| 10,032,100 B2 | 7/2018 | Mullen et al. | |
| 10,095,974 B1 | 10/2018 | Mullen et al. | |
| 10,169,692 B2 | 1/2019 | Mullen et al. | |
| 10,176,419 B1 | 1/2019 | Cloutier et al. | |
| 10,181,097 B1 | 1/2019 | Mullen et al. | |
| 10,198,687 B2 | 2/2019 | Mullen et al. | |
| 10,223,631 B2 | 3/2019 | Mullen et al. | |
| 10,255,545 B2 | 4/2019 | Mullen et al. | |
| 10,325,199 B2 | 6/2019 | Mullen et al. | |
| 10,430,704 B2 | 10/2019 | Mullen et al. | |
| 10,467,521 B2 | 11/2019 | Mullen et al. | |
| 10,496,918 B2 | 12/2019 | Mullen et al. | |
| 10,579,920 B2 | 3/2020 | Mullen et al. | |
| 10,693,263 B1 | 6/2020 | Mullen et al. | |
| 2001/0034702 A1 | 10/2001 | Mockett et al. | |
| 2001/0039511 A1 | 11/2001 | Duckworth et al. | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0069846 A1 | 4/2003 | Marcon | |
| 2003/0116635 A1 | 6/2003 | Taban | |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 | 12/2003 | Finkelstein | |
| 2004/0010462 A1 | 1/2004 | Moon et al. | |
| 2004/0035942 A1 | 2/2004 | Silverman | |
| 2004/0133787 A1 | 7/2004 | Doughty | |
| 2004/0162732 A1 | 8/2004 | Rahim et al. | |
| 2004/0172340 A1* | 9/2004 | Bishop | G06Q 30/0269 705/50 |
| 2004/0172535 A1 | 9/2004 | Jakobsson | |
| 2004/0177045 A1 | 9/2004 | Brown | |
| 2005/0021400 A1 | 1/2005 | Postrel | |
| 2005/0043997 A1 | 2/2005 | Sohata et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0116026 A1 | 6/2005 | Burger et al. | |
| 2005/0119940 A1 | 6/2005 | Concilio et al. | |
| 2005/0133590 A1 | 6/2005 | Rettenmyer et al. | |
| 2005/0154643 A1 | 7/2005 | Doan et al. | |
| 2005/0228959 A1 | 10/2005 | D'Albore et al. | |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0249575 A1 | 11/2006 | Turner et al. | |
| 2006/0256961 A1 | 11/2006 | Brainard et al. | |
| 2007/0034700 A1 | 2/2007 | Poidomani et al. | |
| 2007/0114274 A1 | 5/2007 | Gibbs et al. | |
| 2007/0124321 A1 | 5/2007 | Szydlo | |
| 2007/0129955 A1* | 6/2007 | Dalmia | G06Q 30/02 705/1.1 |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0265912 A1* | 11/2007 | Belanger | G06Q 30/0242 705/14.27 |
| 2007/0192249 A1 | 12/2007 | Biffle et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0016351 A1 | 1/2008 | Fontana et al. | |
| 2008/0019507 A1 | 1/2008 | Fontana et al. | |
| 2008/0021785 A1* | 1/2008 | Hessburg | G06Q 10/02 705/14.27 |
| 2008/0028447 A1 | 1/2008 | O'Malley et al. | |
| 2008/0029607 A1 | 2/2008 | Mullen | |
| 2008/0035738 A1 | 2/2008 | Mullen | |
| 2008/0040271 A1 | 2/2008 | Hammad et al. | |
| 2008/0040276 A1 | 2/2008 | Hammad et al. | |
| 2008/0054068 A1 | 3/2008 | Mullen | |
| 2008/0054079 A1 | 3/2008 | Mullen | |
| 2008/0054081 A1 | 3/2008 | Mullen | |

(56) References Cited

U.S. PATENT DOCUMENTS

| | | |
|---|---|---|
| 2008/0058016 A1 | 3/2008 | Di Maggio et al. |
| 2008/0059303 A1* | 3/2008 | Fordyce ............ G06Q 30/0239 |
| | | 705/14.27 |
| 2008/0059379 A1 | 3/2008 | Ramaci et al. |
| 2008/0065555 A1 | 3/2008 | Mullen |
| 2008/0096326 A1 | 4/2008 | Reed |
| 2008/0116285 A1 | 5/2008 | Shoemaker |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2010/0179870 A1* | 7/2010 | Postrel ............ G06Q 30/0227 |
| | | 705/14.29 |
| 2011/0028184 A1 | 2/2011 | Cooper |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2012/0286037 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0282573 A1 | 10/2013 | Mullen et al. |
| 2013/0282575 A1 | 10/2013 | Mullen et al. |
| 2015/0186766 A1 | 7/2015 | Mullen et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

A Day in the Life of a Flux Reversal. http://www.phrack.org/issues.html?issue=37&id=6#article. As viewed on Apr. 12, 2010.

Dynamic Virtual Credit Card Numbers. http://homes.cerias.purdue.edu/~jtli/paper/fc07.pdf. As viewed on Apr. 12, 2010.

English translation of JP 05210770 A.

* cited by examiner

ADVANCED LOYALTY APPLICATIONS FOR POWERED CARDS AND DEVICES

CROSS-REFERENCE TO RELATED APPLICATION

This application is a continuation of U.S. patent application Ser. No. 15/925,624, titled "Advanced Loyalty Applications For Powered Cards and Devices," filed on Mar. 19, 2018, which is a continuation of U.S. patent application Ser. No. 13/944,455, titled "Advanced Loyalty Applications For Powered Cards and Devices," filed on Nov. 16, 2017, which is a continuation of U.S. patent application Ser. No. 15/815,648, titled "Advanced Loyalty Applications For Powered Cards and Devices," filed on Jul. 17, 2013, which is a continuation of U.S. patent application Ser. No. 12/857,766, titled "Advanced Loyalty Applications For Powered Cards and Devices," filed on Aug. 17, 2010, which claims the benefit of U.S. Provisional Patent Application No. 61/234,583, titled "Advanced Loyalty Applications For Powered Cards and Devices," filed Aug. 17, 2009, each of which is hereby incorporated by reference herein in their entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

Advanced loyalty features are provided on cards and devices such as payment cards. Such cards and devices may, for example, allow a user to purchase a product not sold by a merchant when the card is used at that merchant. For example, a card or device may include a user interface able to receive manual input to indicate that a user desires to purchase a product not sold by a merchant (or a particular merchant product). Such a card or device may send information indicative of such a user desire during a payment transaction at the merchant. For example, information may be communicated in a discretionary data field of one or more tracks of magnetic stripe data (e.g., via a dynamic magnetic stripe communications device). As per another example, information may be communicated via RFID communications to an RFID reader or IC chip (e.g., EMV chip) communications to an IC chip reader. The value of such a product chosen by a user may be subtracted from a user's cash account, available line of credit, or available point balance. A display may be included to display information indicative of a user's selection (e.g., to purchase a non-merchant product) such that a user may enter this information into a data entry field of an online store. Such products may include, for example, damage insurance and/or theft insurance. Multiple user payment accounts may be linked. For example, if a user desires to pay for an additional product with points and that user's point balance does not have enough points to cover the purchase price of the product, then a user's credit or debit account may be utilized to pay for the entire price of the product or the outstanding balance needed to purchase the product. An LED may indicate a particular user selection (e.g., via different colors). A display may be provided next to a button such that a user can see information representative of the product being purchased. The product displayed may be toggled from a list of products by, for example, pressing a button additional times. A confirmation button may also be provided such that a user presses a button first to activate a display and display a product name and then presses the confirmation button to confirm. A card may include a default method of payment (e.g., credit, debit, gift balance, or points) associated with a particular button (e.g., a button for purchasing a particular product). Limitations with such a default (e.g., a minimum point balance needed to utilize a product purchase with points) may be communicated to a user at card issue (e.g., via physical mail, email, or posting on a user's account page of a card issuer's website).

A user interface is provided on a card or device that allows a user to indicate a desire to top-up a purchase to the nearest dollar (or other monetary unit) and use the excess to purchase additional points. For example, a user may press a button on a card associated with $5 such that every purchase is rounded up to the nearest $5. In doing so, any excess amount between the price of a purchase and the round-up interval may be utilized to purchase points at a particular conversion rate. The conversion rate to buy points in this manner may be different (e.g., more points may be purchased for a particular monetary unit) than the conversion rate to buy points outside of a purchase transaction.

All or a portion of the purchase price of merchant items may be paid for at the merchant using points. A card or device may include buttons associated with monetary amounts (e.g., $1, $5, and $10). A user may press a button associated with the desired amount of money a user desires to pay for an item with points. A user may select an amount greater than the purchase price and the difference may be added to a user's credit balance or debit account at a point-to-cash conversion rate. Such a conversion rate may be different (e.g., more points needed for a monetary unit) than if a user selects a monetary amount that only pays for a portion of a purchase.

A user may earn points for different point accounts by providing different manual input for the different point accounts. Different buttons may be provided on a card or device. One, more than one, or all point accounts may be point pools. A point pool may be connected to different accounts—such as different cards. Such different accounts may be owned by different users (e.g., a husband and a wife). Accordingly, for example, points may be shared between multiple users. For example, a card may have a vacation pool. Every member of the family may have a card linked to such a vacation pool. In order to redeem points in a pool, for example, a particular user (e.g., a father), multiple users (e.g., a father and a mother), or all users (e.g., all members of a family) may need to agree to redeem the points for a particular award (e.g., a free vacation). Such users can do so, for example, on each user's account webpage of a main account. Multiple people may also share the same account (e.g., a husband and a wife) such that two cards are issued with the same account number and share the same point account. A cardholder may elect to contribute some or all of the points earned with a purchase to the account of a beneficiary (e.g., a child).

A card is provided that includes a user interface for receiving manual input indicative of a user's desire to forego earning points with a purchase in order to obtain an entry into a lottery. Alternatively, for example, an entry into a lottery may cost a particular number of points (e.g., over 1 point such as 50 points). Additionally, for example, an entry may only be able to be purchased while a user is purchasing an item or an entry may be able to be purchased at any time. Such a lottery may be held at least, for example, once a day, once a month, once a quarter, once every six months, or once a year. Multiple prizes and multiple winners may be included in each lottery. A winner of a lottery may win, for example, points (e.g., 1 million points), cash, and/or products. Non-point awards (e.g., plane tickets) may also be awarded in such a lottery.

A user interface may be provided on a card or button operable to receive manual input indicative of a user's desire to not earn points at a purchase from a merchant in order to obtain the ability to receive a particular point multiplier at the user's next purchase at that merchant so long as the purchase is transacted within a particular period of time (e.g., within a week or within a month). For example, a user may press a button on a card and associated information may be communicated in the discretionary data field of magnetic stripe data. Such a user may, for example, not earn any points with that purchase but may earn three times as many points with the next purchase at that merchant if the two purchases are made within a week of one another. The triple points may be, for example, limited to overlapping purchase value such that if the first purchase is $50 and the second purchase is $75 only $50 worth of purchase value obtains triple points. The remaining $25 of value may obtain no points or single points (regardless of the order of the $50 and $75 purchases). As per another example, the remaining $25 in value may receive double or triple points. Such a point bonus may be limited by a minimum purchase threshold for either a first or subsequent purchase (e.g., for qualifying purchases).

A card may be provided with an option (e.g., a manual user interface) for a user to select an opt-in marketing feature. Such a feature may send information to a merchant through, for example, magnetic stripe data communicated through a dynamic magnetic communications device. Such information may include, for example, demographic information or contact information (e.g., a user's email address). In turn, the merchant may fund a discount or additional points (e.g., a point multiplier such as double points) for the purchase. If a user has already used the opt-in feature at the merchant, the user may or may not be awarded the benefit associated with the user using the opt-in feature for the first time at a merchant. A merchant may send a user a communication (e.g., an email) as a result of receiving the user's email address in a communication to a payment card reader. The user may receive points from filling out such a survey.

Points may be utilized, for example, to purchase discounts for purchases. For example, a particular number of points may provide a 5%, 10%, 15%, or 20% discount on a purchase. A purchase limit for the discount may be provided (e.g., $100) or no purchase limit for the discount may be provided. If a limit is provided and the purchase is over the limit, the discount may only be applied to the limited amount (e.g., $100). Points may be utilized to purchase rebates (e.g., $5, $10, or $20) for a purchase. Such rebates or discounts may be, for example, open to all merchants or limited to qualifying purchases at participating merchants). Discounts and rebates may be processed by a card issuer by placing a credit on a credit statement having the value of the discount or rebate. In doing so, for example, rebates and discounts may be provided at any merchant without the knowledge of the merchant. Point levels required for purchase of a particular rebate or discount (or any other offering such as purchase insurance) may be communicated to a user via email, physical mail, or a user's account page on a card issuer's website. A product purchased with points via a button on a card may be, for example, an extended warranty associated with the products of a purchase as well as defect, damage, and/or theft protection. Other products purchased for points (or from other sources of payment) include, for example, product registration, expedited delivery, and ombudsman service.

Combinations of features may be provided on a card. For example, a card may be provided with a button associated with a feature that allows a user to earn a point multiplier at a second transaction within a period of time at a particular merchant. Another button may be provided on that card associated with a lottery feature. Yet another button may be provided on that card that allows a user to purchase a product at a purchase. Such a product may be associated with the purchase (e.g., purchase insurance for that product).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
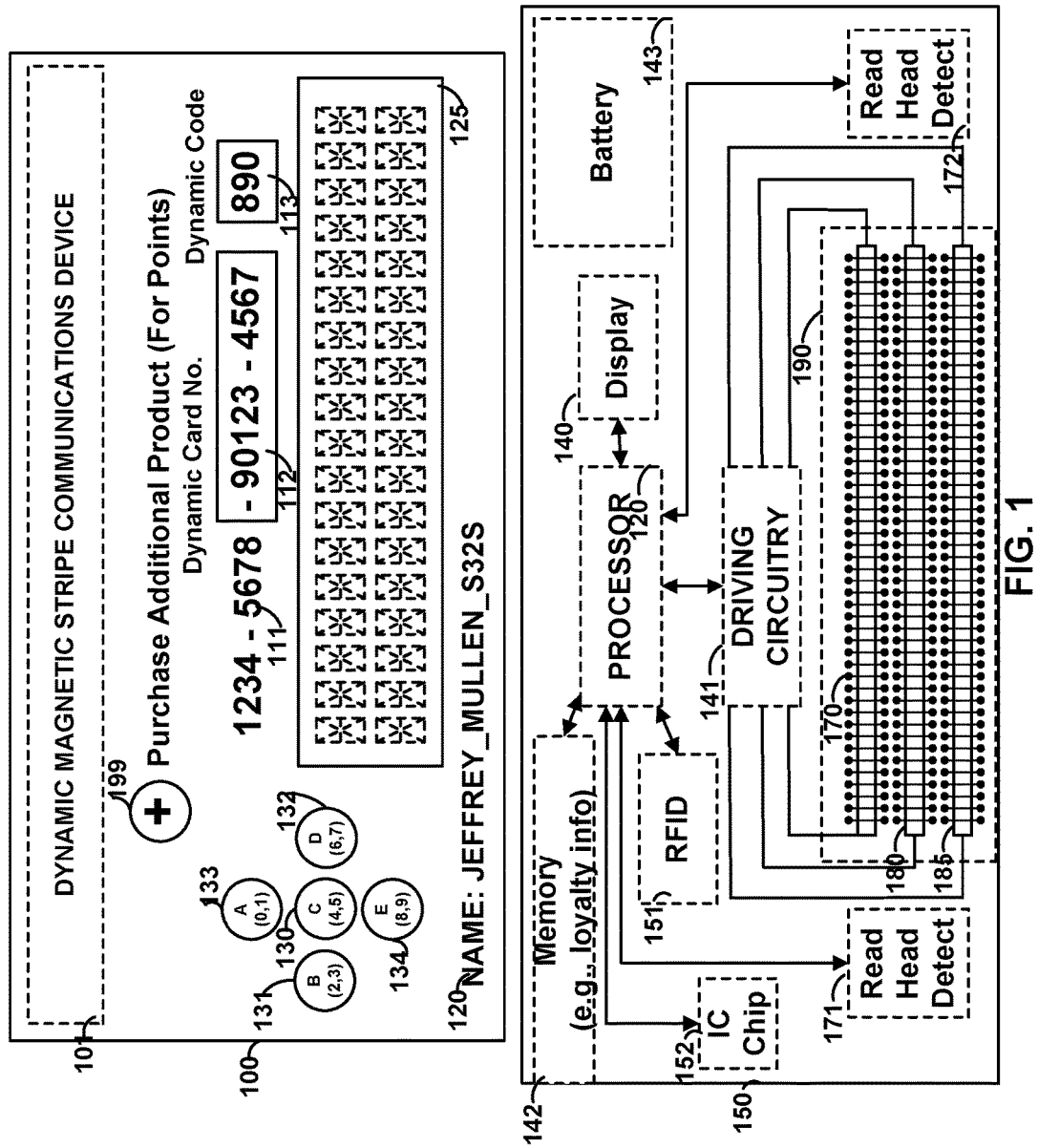
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. Card 100 may include button 199. Button 199 may be used, for example, to communicate information through dynamic magnetic stripe communications device 101 indicative of a user's intent to purchase a particular product with a purchase for points.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may store discretionary data codes associated with buttons of card 150. Such codes may be recognized by remote servers to effect particular actions. For example, a code may be stored on memory 142 that causes a non-merchant product to be purchased with points during a merchant transaction. Memory 142 may store loyalty information such as identifying information for a points account (e.g., a points account number) and associated information (e.g., a default preference on how points are earned during a purchase, such as 50% of a purchase's points is given to the user and 50% of a purchaser's points is used to purchase lottery entries for a lottery that has at least one award of a particular number of points).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
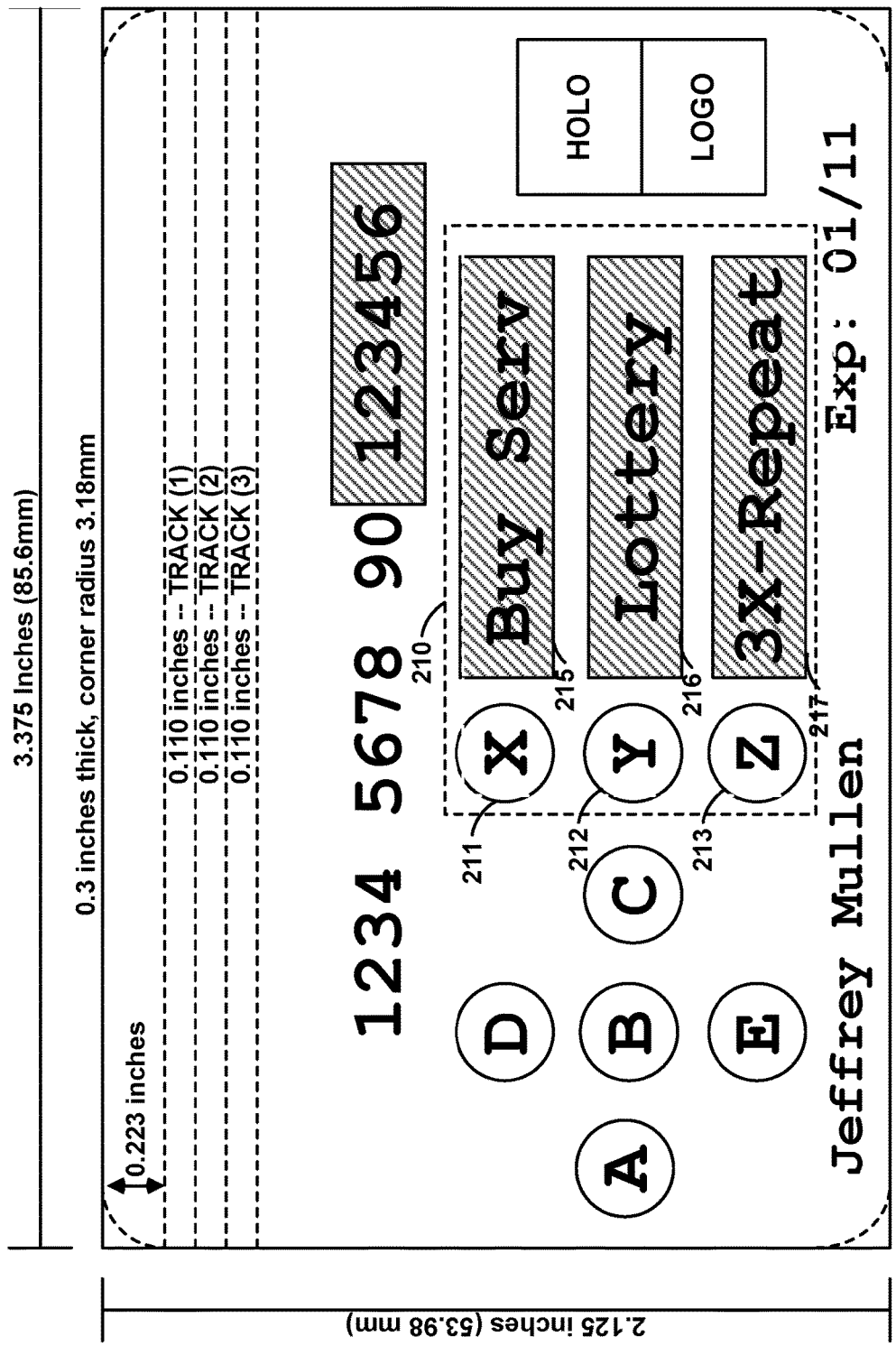
FIG. 2 is an illustration of a card constructed in accordance with the principles of the present invention.

FIG. 2 shows card 200 that includes button 211 associated with display 215, button 212 associated with display 216, and button 213 associated with display 217. Each button may be associated with a feature displayed in display 210. A user may press a button in order to communicate data representative of the feature through a magnetic stripe communications device or other communications device (e.g., RFID or IC chip). A light emitting diode (or other source of light) may be associated with each button to indicate to a user what feature was selected by a user. A user may be able to select multiple features such that multiple feature codes are communicated in tracks of magnetic stripe data communicated by a magnetic stripe communications device. Such codes may be provided in discretionary data fields. Such codes may be repeated on each track of communicated magnetic stripe data (e.g., repeated on tracks 1 and 2 or repeated on tracks 1, 2, and 3). In doing so, a user may associate multiple features to a purchase. A user may purchase a financial service by, for example, pressing button 211 for a purchase transaction. A user may press button 212 to enter into a lottery. The cost of the entry may be that no points are earned during the transaction. Button 213 may allow a user to earn multiple points if a purchase is made at the same merchant within a particular time period (e.g., over a day such as within a week) for a cost. The cost may be that a user does not earn any points with the initial purchase or earns a reduced amount of points (e.g., 50% point reduction). Persons skilled in the art will appreciate that one or more remote servers may manage a point balance as well as authorize and settle transactions.

The features associated with each card may be pre-determined by a user. For example, a user may select features to place on a card when ordering a card. Additionally, a user may go to a card issuer's website and select attributes of features. For example, a user may visit a card issuer's website and select the particular offering that is to be purchased whenever a user selects the feature associated with button 211 and displayed on display 215. Information associated with a button may be displayed via a display or permanently printed, embossed, or laser engraved on a card. Card 200 may include a light sensing device to receive information via light pulses from a display (e.g., a television, mobile phone, or laptop display). A user may select to change the features or attributes of features from a card issuer's websites and may reconfigure a card accordingly. Alternatively, a card may be provided with buttons and no descriptive information. A user may change the features or attributes of features associated with one or more buttons via a card issuer's website and remote processing may perform the associated processing as a result of on-card button selections. Different codes may be communicated depending on the feature or attributes of features on a card. Such codes may be changed via a wireless communications signal (e.g., a light-based communications signal). In doing so, processing may occur off-card at a remote server without the need to determine what feature a user associated with a code. Persons skilled in the art will appreciate that a card issuer may monitor the frequency and number of times that a user utilizes a particular feature. A card issuer may cross-sell new products based on this information. For example, suppose a user's card allows a user to purchase insurance for that purchase with a particular number of points. If the user utilizes this option at a particular frequency or a particular number of times, then the user may be sent an offer to purchase the product on a periodic subscription basis (e.g., monthly) instead of an individual purchase. The offer may be communicated, for example, via physical mail, email, or a card issuer's website. In doing so, a card issuer may convert cardholders to subscription-based products the cardholder has tested in a per-purchase environment. If a user purchases a subscription for a product that was associated with a button on a card, the card issuer may change the product associated with that button and notify the user of the change (e.g., via email or a card issuer's website). Persons skilled in the art will appreciate that various types of insurance may be provided. For example, insurance may be associated with a purchase such that if a merchant fails to deliver a product, the insurance covers the incident. Insurance may also be provided, for example, for damage to a product during shipping. Insurance may cover multiple types of incidents. A card issuer may add or modify the attributes of a feature. For example, a card issuer may modify or add products in a list of products associated with a buy product for points feature. The addition or modification may be communicated via light information pulses. Additionally, a user may be provided with a code to enter into buttons on a card where the code represents the modifications or additions. Additionally, the card may receive wireless communications signals (e.g., WiFi signals) associated with the modifications and additions). In this manner, a merchant may change the information on a display associated with a lottery feature to read "win 1M points" during a first period of time and "win Olympic tickets" during a second period of time.

A card issuer may provide a reward network of participating merchants. Accordingly, merchant specific promotions may be provided and paid for with points. For example, a particular merchant may allow for free overnight shipping for a particular number of points while another merchant may allow for an extended warranty for a particular number of points. All such promotions may be associated to a single button (or more than one button). Permanent indicia associated to the single button may generically describe all such merchant-specific promotions (e.g., "merchant promotion"). A different point conversion rate (e.g., a discounted lower point conversion rate) may be provided when items are purchased at a merchant inside of the rewards network versus merchants outside of the rewards network. Such products may be merchant products or non-merchant products. For example, a user may purchase any merchant items using points (e.g., any DVD at a Best Buy) but may receive different conversion rates for the points depending on whether the merchant is within a card issuer's reward network as well as the level of membership within that issuer's reward network. Merchants (e.g., merchants that are part of a particular rewards network) may be provided with devices that offer on-the-spot promotions. Such devices may emit light pulses or other communication signals that are received and stored on a card or other device. A card may prompt a user to interact with a card (e.g., press a button) to confirm acceptance and desire to use a communicated promotion. A promotion may be paper based, but may interact with payment process that includes a card or other device. For example, a user may pick up a coupon that states "give this coupon to a friend and if that friend makes a purchase within 10 days, you will get double points." The cashier may then scan the barcode of the coupon and a user may press a MERCHANT OFFER button on a card. The merchant system may similarly send the coupon code to a remote system. An associated code may be communicated with payment information (e.g., magnetic stripe data) to the remote system. The remote system may then associate the purchase with the coupon code. Upon a friend redeeming the coupon, the user associated with the original payment information may be provided with additional points (e.g., double points). As per another example, a merchant may pre-register with a card issuer the merchant's promotion. The promotion may be, for example, a cross-merchant promotion where a user that purchases an item at one merchant may receive double points and a 10% discount if a paper coupon is used within a particular number of days at a different merchant. To qualify, a user may be required to press a MERCHANT OFFER button. A card issuer may then retrieve the promotion for the merchant from a database to learn that the user has opted in for the cross-merchant promotion. Accordingly, the card issuer's processing system may periodically check during the promotional window (or at the end of the promotion) whether the user has made a purchase at the second merchant to receive the double points. The coupon may be utilized at the second merchant to receive the 10% discount. Alternatively, for example, the coupon may also be needed to obtain the double points in addition to the 10%.

Figure 3:
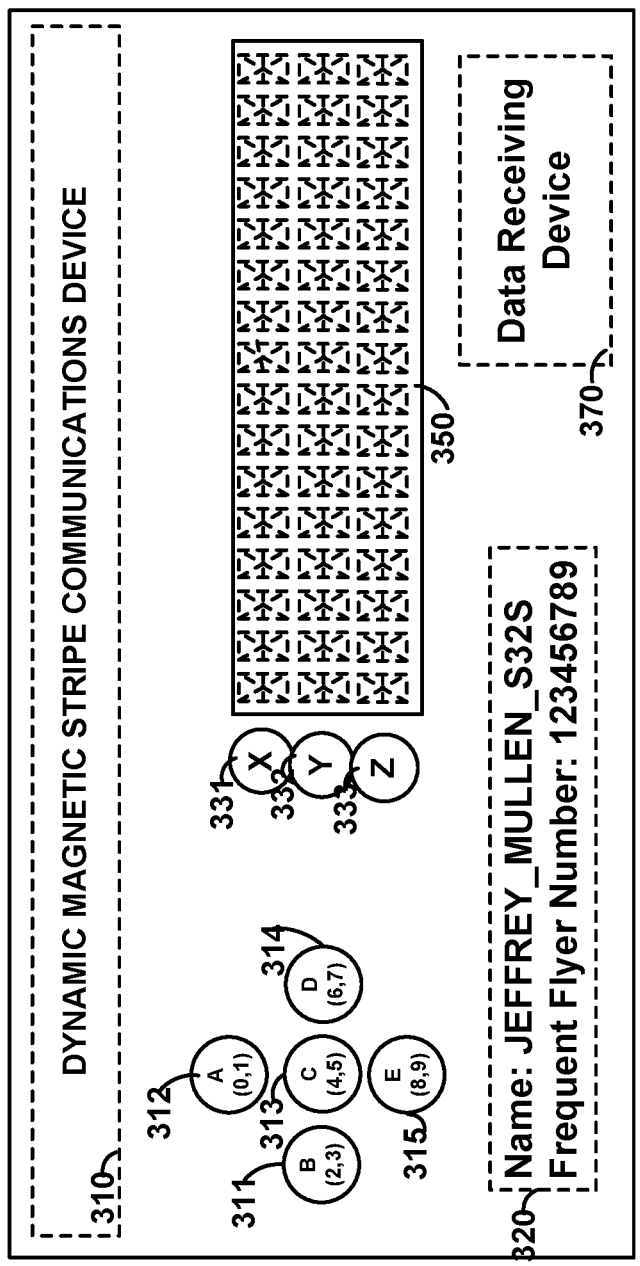
FIG. 3 is an illustration of a card constructed in accordance with the principles of the present invention.

FIG. 3 shows card 300 that may include dynamic magnetic stripe communications device 310, buttons 311-315, permanent information 320, display 350, data receiving device 370, and buttons 331-333. Button 331 may be associated with a first line of displayed information on display 350. Button 332 may be associated with a second line of displayed information on display 350. Button 333 may be associated with a third line of displayed information on display 350. Persons skilled in the art will appreciate that buttons 331-333 may actually be virtual buttons on display 350 and display 350 may be a capacitive touch screen. Data receiving device 370 may be a light or sound sensor for receiving information through received light or sound.

Figure 4:
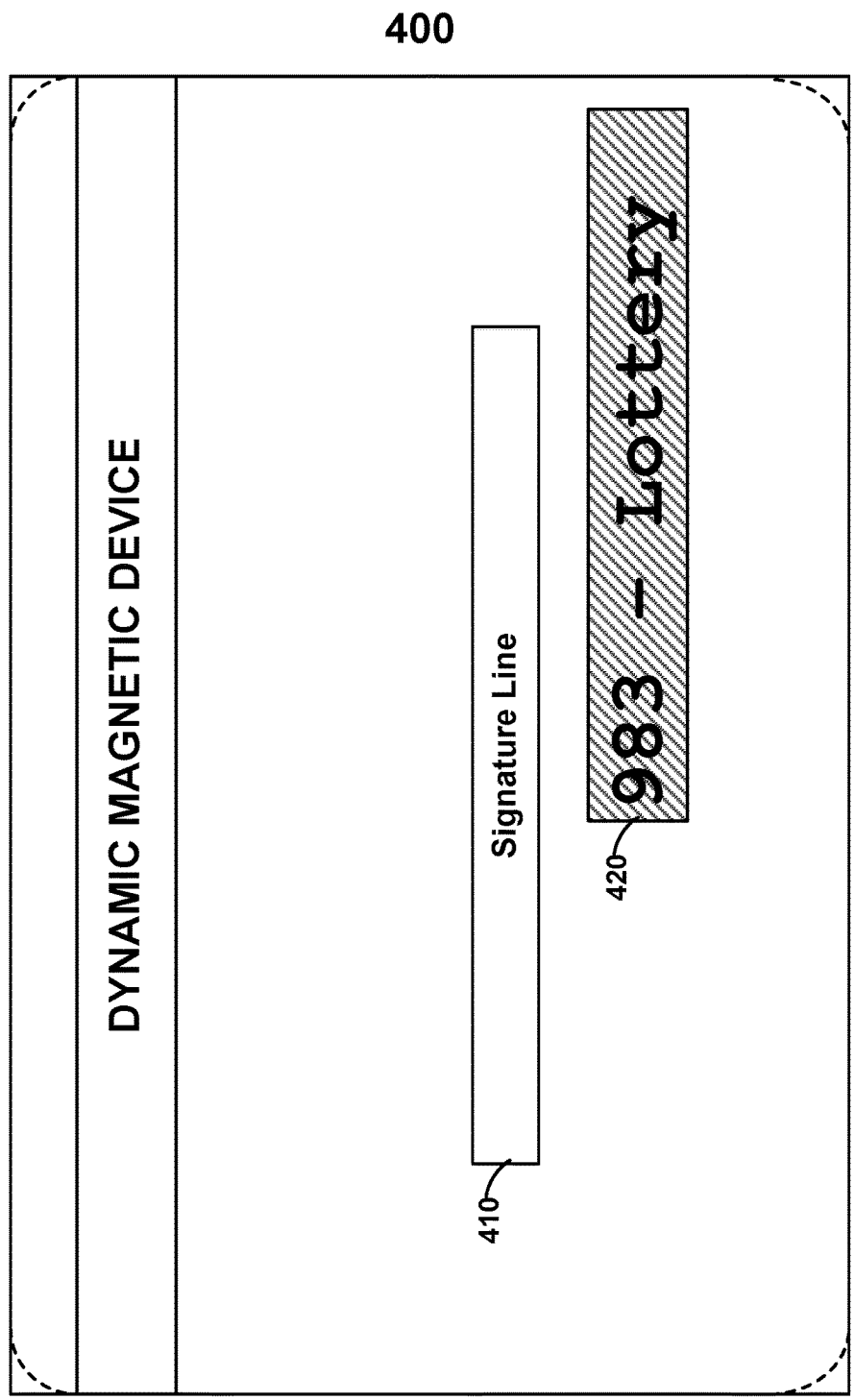
FIG. 4 is an illustration of a card constructed in accordance with the principles of the present invention.

FIG. 4 shows card 400 that may include signature line 410 and display 420. Persons skilled in the art will appreciate that card 300 of FIG. 3 may depict the obverse side of a card and card 400 of FIG. 4 may depict the reverse side of a card.

Individual components of card 300 of FIG. 3 or card 400 of FIG. 4 may be provided on either side of a card or both sides of a card. More than one instance of a component may be provided on any side of a card (e.g., the same side as a component or a different side as a component). Persons skilled in the art will appreciate that a user may communicate feature codes representative of a user's on-card selection via codes that may be displayed visually and entered into a webpage as part of an online payment. A display may display not only a code for an online payment, but also indicia representative of the feature. In doing so, the user can confirm that the right feature was selected. Persons skilled in the art will appreciate that different codes for the same feature may be displayed and communicated via a dynamic magnetic communications device. In doing so, the security of the card may be increased. Additionally, the same or different codes may be communicated on different tracks of data to represent the selection of a particular feature.

Figure 5:
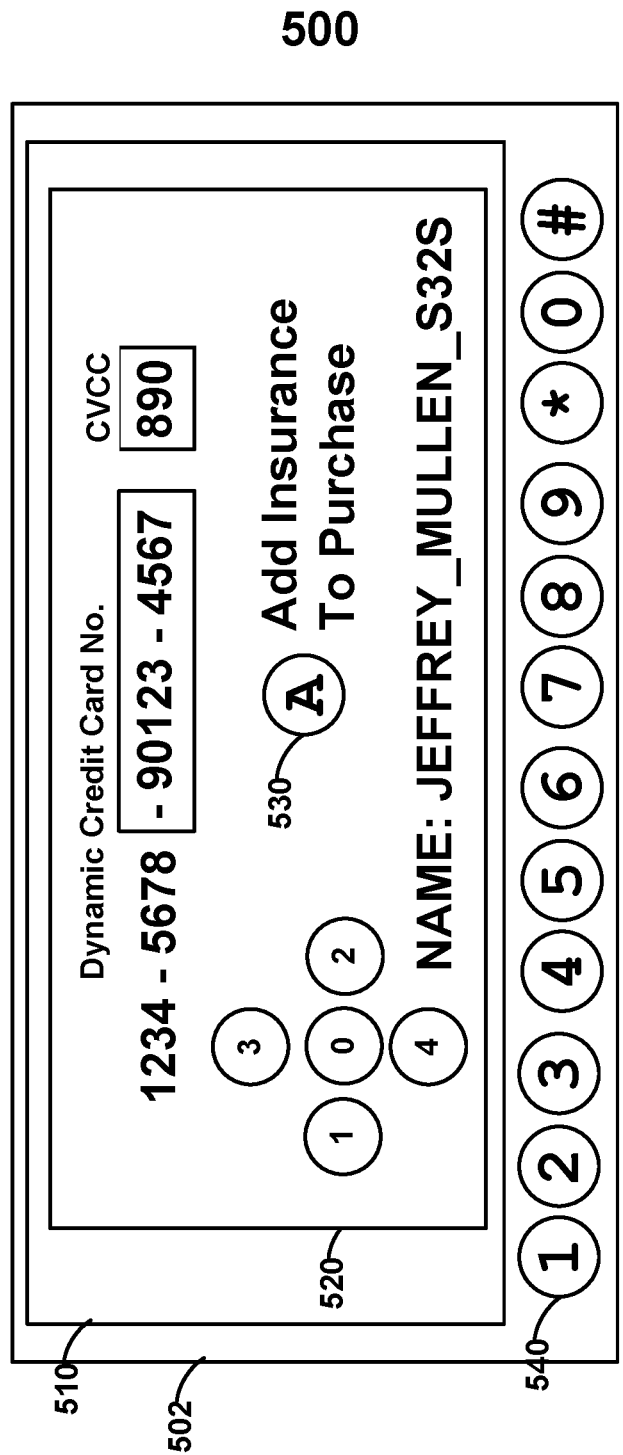
FIG. 5 is an illustration of a mobile device constructed in accordance with the principles of the present invention.

FIG. 5 shows mobile device 500, which may be a mobile telephonic device. Device 500 may include one or more physical buttons (e.g., button 540). Device 500 may include one or more display screens 510. Such a display screen may be touch sensitive such that virtual buttons (e.g., button 530 may be provided) on virtual card 520. Virtual card 520 may appear similar to a physical card described herein. A user may select different virtual cards by, for example, swiping his/her finger across a touch-sensitive display to scroll to the next virtual card. Mobile phone 502 may include a communications device operable to communicate data to a card reader. For example, mobile phone 502 may include an RFID antenna to communicate to an RFID reader, a pop-out IC chip panel operable to be fed into an IC chip reader, or a magnetic communications device having a magnetic emulator operable to communicate magnetic stripe data wirelessly to a read-head of a magnetic stripe reader.

Persons skilled in the art will also appreciate that the present invention is not limited to only the embodiments described. Instead, the present invention more generally involves dynamic information. Persons skilled in the art will also appreciate that the apparatus of the present invention may be implemented in other ways than those described herein. All such modifications are within the scope of the present invention, which is limited only by the claims that follow.

What is claimed is:

1. A transaction device, comprising:
   a communication device operable to communicate transaction data as part of a purchase of a merchant product using a first currency, the transaction data including payment information associated with the purchase and second information; and
   a user interface operable to provide the second information in the transaction data, the second information indicative of a selection to pay a first monetary value in the first currency to obtain a second currency.

2. The transaction device of claim 1, wherein the second currency is loyalty points.

3. The transaction device of claim 1, wherein the first monetary value is the difference between a second monetary value and a cost of the merchant product.

4. The transaction device of claim 1, wherein the second currency is loyalty points, and
   the first monetary value is the difference between a second monetary value and a cost of the merchant product.

5. The transaction device of claim 1, wherein the second currency is loyalty points, and
   the first monetary value is a cost of the merchant product rounded up to a second monetary value.

6. The transaction device of claim 1, wherein the second currency is loyalty points, and
   the first monetary value is a cost of the merchant product rounded up to the nearest five dollars.

7. The transaction device of claim 1, wherein the transaction device is a mobile telephonic device.

8. The transaction device of claim 1, wherein the transaction device is a powered card.

9. The transaction device of claim 1, wherein the communication device is operable to communicate with a reader.

10. The transaction device of claim 1, wherein the communication device is operable to communicate with a reader.

11. The transaction device of claim 1, wherein the purchase is an online purchase.

* * * * *